United States Patent [19]
Tanaka

[11] Patent Number: 5,908,177
[45] Date of Patent: Jun. 1, 1999

[54] FLIGHT CONTROL SYSTEM

[76] Inventor: Yasunari Tanaka, c/o Gifu Plant No. 1 of Teijin Seiki Co., Ltd., 1110-1, Aza Ozaki, Miyashiro, Tarui-cho, Fuwa-gun, Gifu-ken, Japan

[21] Appl. No.: 08/652,697

[22] Filed: May 30, 1996

[30] Foreign Application Priority Data

Jul. 12, 1995 [JP] Japan ................................ 7-176118

[51] Int. Cl.⁶ .................. B64C 13/30; B64C 13/46
[52] U.S. Cl. ................ 244/223; 244/227; 244/232
[58] Field of Search .......................... 244/75 R, 87, 244/90 R, 221, 223, 227, 228, 232, 236

[56] References Cited

U.S. PATENT DOCUMENTS

| | | | |
|---|---|---|---|
| 2,953,325 | 9/1960 | Hadekel | 244/223 |
| 3,489,379 | 1/1970 | Bogart | 244/223 |
| 4,106,728 | 8/1978 | Griffith | 244/223 |
| 4,236,685 | 12/1980 | Kissel | 244/223 |
| 4,382,281 | 5/1983 | Fowler et al. | 244/223 |
| 4,607,202 | 8/1986 | Koenig | 244/223 |
| 4,793,576 | 12/1988 | Frerk | 244/288 |

FOREIGN PATENT DOCUMENTS 483773  5/1992  European Pat. Off. ................ 244/223

*Primary Examiner*—Virna Lissi Mojica

[57] ABSTRACT

Herein disclosed is a flight control system comprising a control member, a control surface controllable to assume different angle positions within a control angle range, a transmission linkage provided between the control member and the control surface to transmit the control force from the control member to the control surface, and a power assist actuator associated with the control member and the transmission linkage to control the control surface. The flight control system further comprises a force sensor provided between a pivot portion of the control member and a support portion of the aircraft to detect a reaction force exerted thereon by the control member and the transmission linkage, and assist force regulating means for regulating the assist force from the power assist actuator to be proportional to the control force from the control member in response to the output signal of the force sensor, thereby making it possible to give an operational feeling corresponding to the detected reaction force to the pilot without providing an artificial feeling apparatus in spite of the fact that the control surface is controlled by the power assist actuator and the human power under the normal condition.

5 Claims, 5 Drawing Sheets

FLIGHT CONTROL SYSTEM

BACKGROUND OF THE INVENTION

The present invention relates to a flight control system for controlling a flight of an aircraft. More particularly, the present invention is concerned with a flight control system including a manual control member and a power-assist actuator for controlling a control surface on the basis of an operation force exerted on the manual control member and a force mechanically fed back to the manual control member from the control surface.

Conventionally, there have been provided a flight control system shown in FIG. 5 as comprising a manual control stick 1, a pivotal support member 2 forming part of the aircraft, a control surface 3, and a transmission linkage 4 provided between the manual control stick 1 and the control surface 3. The manual control stick 1 has a manual input portion 1a, a pivot portion 1b and a control force output portion 1c connected with one another. The manual input portion 1a of the manual control stick 1 is manually operated to have the control force output portion 1c pivotally move around the pivot portion 1b. The control surface 3 has a surface pivot portion 3a and is pivotally mounted at the surface pivot portion 3a on a support portion, not shown, forming part of the aircraft. This control surface 3 is controllable to assume different angle positions within a predetermined control angle range, and is controlled by the control force outputted from the manual control stick 1. The transmission linkage 4 is constituted by a link member 6, a first pulley 7 having a rotation shaft portion 7a rotatably supported by the body of the aircraft, a second pulley 8 having a rotation shaft portion 8a rotatably supported by the body of the aircraft and connected to the surface pivot portion 3a of the control surface 3, and an endless belt 9 put round and encircling the first and second pulleys 7 and 8. The transmission linkage 4 is adapted to transmit the control force from the manual control stick 1 to the control surface 3 and the reaction force mechanically fed back from the control surface 3 to the manual control stick 1.

The flight control system of this kind is simply structured as above, and therefore utilized widely for aircraft of small sizes. In the case that the control surface is equipped with a balance tab, a spring tab or the like which is designed to assist the manual operation force of the control member by the air force exerted on the tab or the like, the above flight control system can be utilized for aircraft of part of middle sizes.

The above flight control system, however, cannot be utilized for aircraft of large sizes and most of middle sizes because the reaction force beyond the human power is mechanically fed back from the control surface to the manual control stick if the above flight control system were utilized for such aircraft.

To avoid these inconveniences, it has been proposed various powered flight control systems each adapted to perform an irreversible control and having a control actuator for controlling the control surface with the force beyond the human power.

Each of the flight control system, however, needs a plurality of actuators each operable to control the control surface and able to substitute for another, since one of the actuators may fail in spite of the fact that the control surface cannot be controlled by the human power. Each of the flight control systems is further required to comprise control means such as for example an SAS (Stability Augmentation System), a CAS (Control Augmentation System), a FBW (Fly-By-Wire) system or another large-scale servo control system.

This results in the drawback that the above powered flight control systems are costly and therefore insufficient to be utilized for aircraft of small and middle sizes.

The present invention contemplates provision of an improved flight control system overcoming the above inconveniences of the prior-art flight control systems.

SUMMARY OF THE INVENTION

It is therefore an object of the present invention to provide a flight control system for controlling a flight of an aircraft, comprising: a control member having an input portion, a pivot portion and a control force output portion connected with one another, a control surface pivotally mounted at its hinge portion on the aircraft and controllable to assume different angle positions within a control angle range, a transmission linkage provided between the control force output portion of the control member and the control surface to transmit the control force from the control member to the control surface; and a power assist actuator associated with the control member and the transmission linkage to control the control surface with an assist force. The input portion of the control member is manually operated to have the control force output portion pivotally move around the pivot portion, and the control surface is controlled by the control force outputted from the control member. The flight control system according to the present invention further comprises a force sensor provided between the pivot portion of the control member and the aircraft to detect a reaction force exerted thereon by the control member and the transmission linkage, the force sensor producing an output signal representative of the reaction force; and force regulating means for regulating the assist force to be outputted from the power assist actuator as to be proportional to the control force from the control member in response to the output signal outputted from the force sensor.

The above force regulating means may be adapted to regulate the assist force to be outputted from the power assist actuator to a degree less than the maximum operation force from the manual control member to the control surface, the maximum operation force corresponding to a predetermined maximum value of the reaction force.

The assist force of the power assist actuator may be regulated to be less than the operation force from the control member when the predetermined maximum value of the reaction force is detected by the force sensor.

The force sensor may be constituted by a link member pivotally connected at one end with the pivot portion of the control member and at the other end with the aircraft, and a strain gauge attached on the link member to detect an axial force exerted on the link member by the control member and the transmission linkage.

BRIEF DESCRIPTION OF THE DRAWINGS

The features and advantages of a flight control system according to the present invention will be more clearly understood from the following description taken in conjunction with the accompanying drawings in which.

DESCRIPTION OF THE PREFERRED EMBODIMENTS

Figure 1:
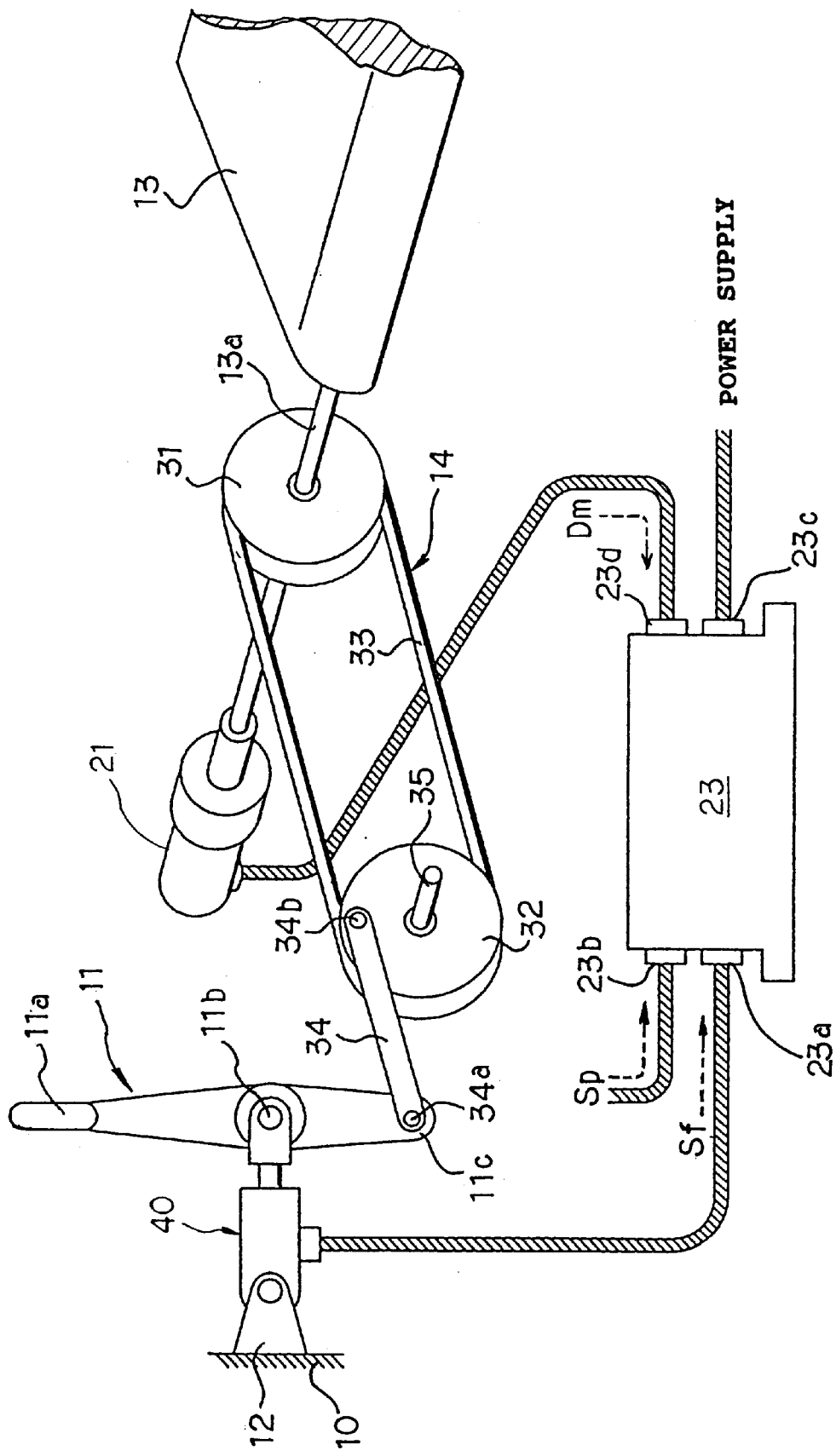
FIG. 1 is a perspective view of an embodiment of the flight control system according to the present invention.

Referring to FIGS. 1 to 4 of the drawings, a preferable embodiment of a flight control system embodying the present invention is shown as comprising a manual control member 11 swingably supported by a pivotal support member 12 forming part of an aircraft not shown in the drawings, a control surface 13 pivotally mounted at its hinge portion 13a on a support portion forming part of the aircraft, a transmission linkage 14 provided between the manual control member 11 and the control surface 13 to transmit the control force from the manual control member 11 to the control surface 13.

The manual control member 11 has an input portion 11a to be operated by a pilot, a pivot portion 11b pivotally supported by the pivotal support member 12 and a control force output portion 11c. The input portion 11a of the manual control member 11 is operated by the hand of the pilot to have the control force output portion 11c of the manual control member 11 pivotally move around the pivot portion 11b of the manual control member 11. The manual control member 11 may be a foot pedal operated by the foot of the pilot. The control surface 13 is pivotally mounted at the surface pivot portion 13a on the aircraft, and controllable to assume different angle positions within a predetermined control angle range. This control surface 13 is designed to serve as e.g., a flap, an aileron, a stabilizer or a rudder controlled by the control force outputted from the manual control member 11. The transmission linkage 14 is provided between the control force output portion 11c of the manual control member 11 and the control surface 13 to transmit the control force from the manual control member 11 to the control surface 13.

The flight control system further comprises a power assist actuator 21 associated with the manual control member 11 and the transmission linkage 14 to control the control surface 13 with an assist force. In this embodiment, the power assist actuator 21 is constituted by an electric motor, for example a DC brush-less motor, connected to the surface pivot portion 13a of the control surface 13. The power assist actuator 21 is adapted to output an assist torque to be exerted on the surface pivot portion 13a of the control surface 13. The control surface 13 is rotated by the control force transmitted through the transmission linkage 14 from the manual control member 11 and the assist torque from the power assist actuator 21. The rotational angle position of the power assist actuator 21 is detected by a motor angle sensor 27 operative to produce an output signal indicative of the rotational angle of the power assist actuator 21. The transmission linkage 14 is constituted by a first pulley 32 having a rotation shaft portion 35 rotatably supported by a support portion forming part of the aircraft, a connecting link 34 pivotally connected at one end 34a to the operation force output portion 11c of the manual control member 11 and at the other end 34b with the peripheral portion of the first pulley 32, an endless wire 33 (or an endless belt) encircling the first pulley 32, and a second pulley 31 connected with the surface pivot portion 13a of the control surface 13 and driven by the first pulley 32 through the endless wire 33 when the manual control member 11 is operated by the pilot.

Figure 2:
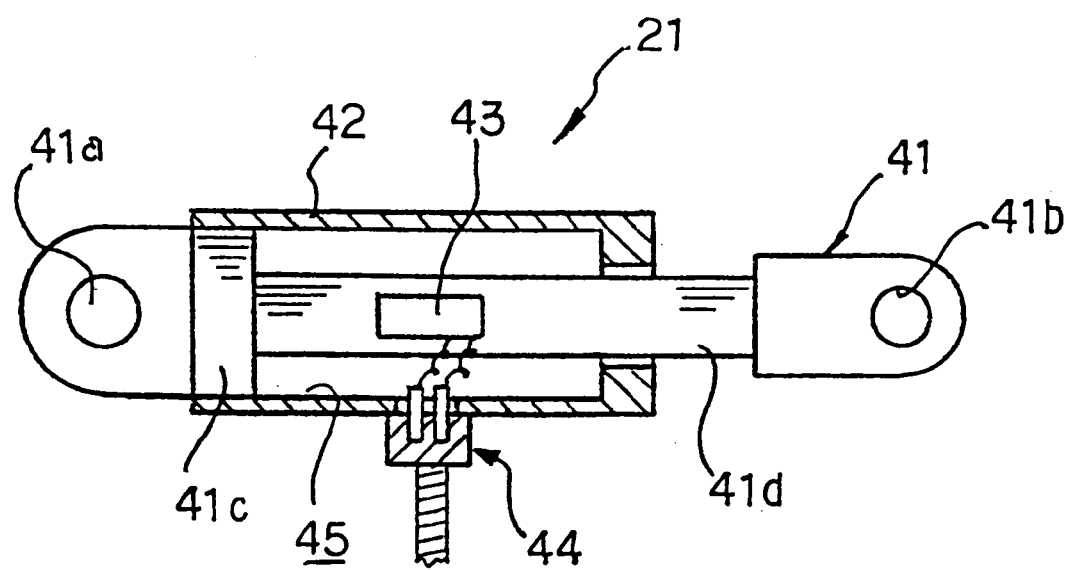
FIG. 2 is a longitudinal sectional view of a force sensor unit forming part of the flight control system.

Between the pivot portion 11b of the manual control member 11 and the support portion 12 of the aircraft, a force sensor unit 40 is provided to detect a reaction force exerted thereon by the manual control member 11 and the transmission linkage 14. As shown in FIG. 2, the force sensor unit 40 is constituted by a link member 41 pivotally connected at one end 41b with the pivot portion 11b of the manual control member 11 and at the other end 41a with the support portion 12 of the aircraft, a strain gauge 43 attached to the link member 41 to detect an axial force exerted on the link member 41 by the manual control member 11 and the transmission linkage 14, a cylindrical cover 42 attached to the link member 41 to define a cylindrical chamber 45 in which the strain gauge 43 is accommodated, and a connector member 44. The strain gauge 43 is connected to a first input port 23a of an assist force control means 23 through the connector member 44, and is designed to produce a force signal Sf representative of the reaction force from the force sensor unit 40 to the pivot portion 11b of the manual control member 11.

Figure 3:
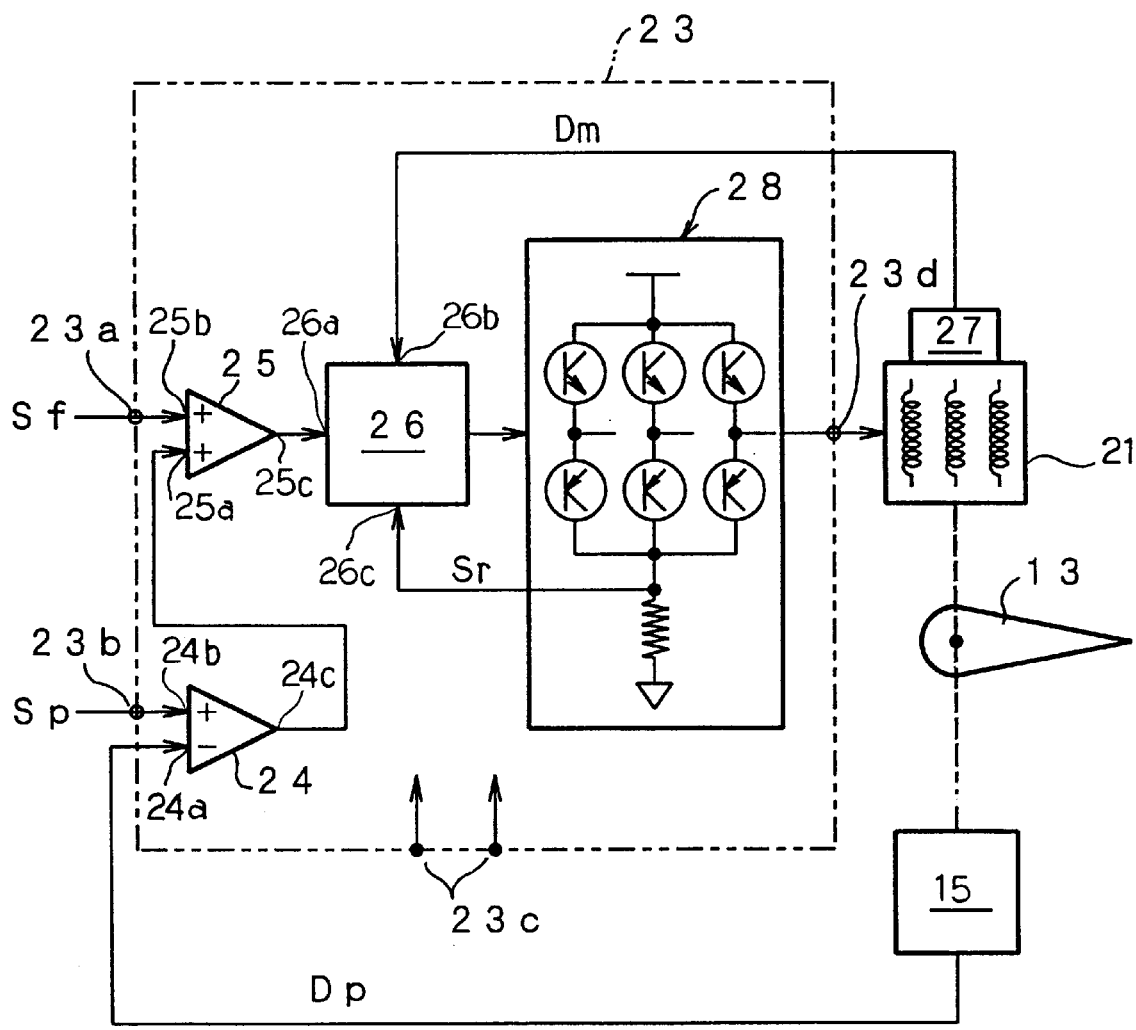
FIG. 3 is a simplified block diagram of force regulating means forming part of the flight control system.

As shown in FIG. 3, the assist force control means 23 includes a differential amplifier 24, a summing amplifier 25, a motor controller 26 and a driver circuit 28. The rotational angle position of the control surface 13 is detected by a surface angle sensor 15 which is adapted to produce an output signal Dp representative of the rotational angle position of the control surface 13 with respect to a predetermined surface position shown in FIG. 3.

The first differential amplifier 24 has first and second input terminals 24a and 24b, and is designed to input the output signal Dp from the surface angle sensor 15 and the command signal Sp from an auto-pilot system, not shown in the drawings, through the first and second input terminals 24a and 24b. The first differential amplifier 24 also has an output terminal 24c from which an output signal representative of the difference between the input signals Sp and Dp is outputted. The summing amplifier 25 has first and second input terminals 25a, 25b and an output terminal 25c, and is designed to input the output signal of the first differential amplifier 24 and the force signal Sf from the strain gauge 43 through the first and second input terminals 24a and 24b. The summing amplifier 25 is adapted to output an output signal representative of the sum of the force signal Sf from the force sensor unit 40 and the output signal of the first differential amplifier 24 through the output terminal 25c. The motor controller 26 has an input portion 26a, a feedback signal portion 26b and a reference signal portion 26c, and is designed to produce an output signal based on the output signal of the summing amplifier 25 and the feedback signal fed back from the motor angle sensor 27. The assist torque outputted from the power assist actuator 21 is controlled by the motor controller 26 to be varied in response to the force signal Sf, i.e., the reaction force detected by the force sensor unit 40.

The above assist force control means 23 is also designed to serve as force regulating means for regulating the assist force outputted from the power assist actuator 21. In other words, the assist force is controlled and regulated by the assist force control means 23 to be proportional to the control force from the manual control member 11 in response to the output signal of the force sensor unit 40. More specifically, the force regulating means 23 is adapted to regulate the assist force from the power assist actuator 21 to a degree less than the maximum operation force transmitted through the transmission linkage 14 from the manual control member 11 to the control surface 13. The maximum operation force corresponds to a predetermined maximum value of the reaction force exerted on the force sensor unit 40. In spite of the fact that the maximum operation force is not beyond human power level, the assist force from the power assist actuator 21 is regulated to be less than the maximum operation force from the manual control member 11. More specifically, the assist torque from the power assist actuator 21 is regulated to be less than the operation torque applied to the surface pivot portion 13a of the control surface 13 from the manual control member 11 when the predetermined maximum value of the reaction force is detected by the force sensor unit 40. The force regulating means 23 regulates the assist force to be outputted from the power assist actuator 21 on the basis of the output signal of the surface angle sensor 15.

The operation of the above flight control system according to the present invention will now be described hereinlater.

At first, the assist force control means 23 is supplied with electric power and energized by the power source not shown in the drawings through power supply portions 23c of the assist force control means 23. The output signal Dp of the surface angle sensor 15 and the output signal Dm of the motor angle sensor 27 are then inputted to the assist force control means 23, while the force signal Sf from the force sensor unit 40 and the command signal Sp from the autopilot system are respectively inputted to the input ports 23a and 23b of the assist force control means 23.

When, on the other hand, the manual control member 11 is operated by the pilot, the control surface 13 is controlled by a manual operation torque corresponding to the output of the manual control member 11 and the output torque of the power assist actuator 21.

At this time, the force sensor unit 40 is pushed or pulled in its axial direction of the link member 41 by the pivot portion 11b of the manual control member 11 against the reaction force from the support portion 12 of the aircraft. At the same time, the manual control member 11 is pushed or pulled at the input portion 11a by the pilot, and is pushed or pulled in approximately the same direction at the control force output portion 11c by the control surface 13 and the transmission linkage 14.

Under these conditions, the reaction force exerted on the manual control member 11 from the support portion 12 is detected by the force sensor unit 40, and the force signal Sf is outputted from the force sensor unit 40 to be inputted to the first input port 23a of the assist force control means 23, viz., one of the input terminals of the summing amplifier 25. The output signal of the differential amplifier 24 is also inputted to the summing amplifier 25 through the other input terminal.

In the event that the power assist actuator 21 and the assist force control means 23 are normally operated, the assist force, i.e., the output force of the power assist actuator 21 is controlled by the assist force control means 23 based on the above input signals Dp, Dm, Sf and Sp. In the concrete, the motor controller 26 is operated to input the signals from the summing amplifier 25 and the motor angle sensor 27, and outputs an output signal based on the above input signals and a reference signal Sr applied thereto from the driver circuit 28. The driver circuit 28 is then operated to output a driving signal to the power assist actuator 21 so as to generate a driving torque proportional to the signal level of the driving signal.

Figure 4:
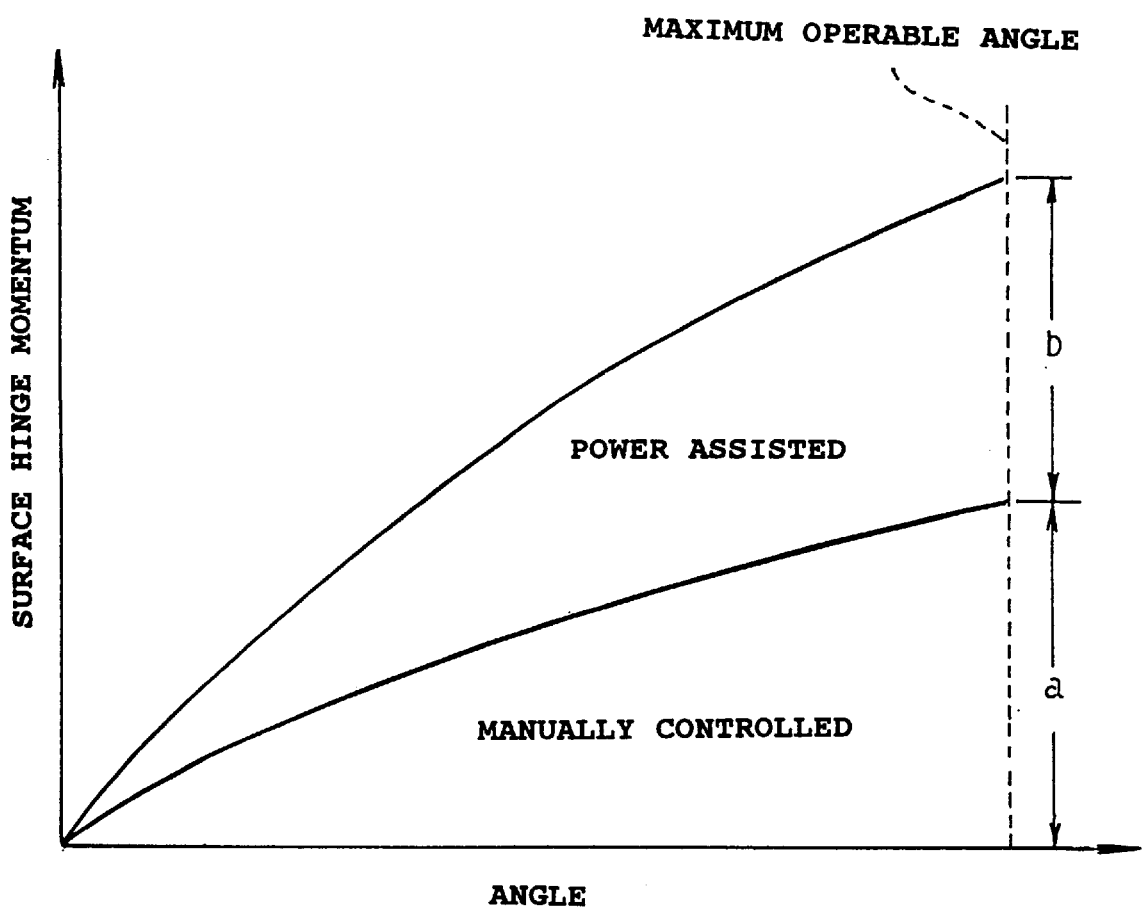
FIG. 4 is a graph showing variations of a manually operated hinge moment and a power assisted hinge moment respectively exerted on a hinge portion of a control surface.
Figure 5:
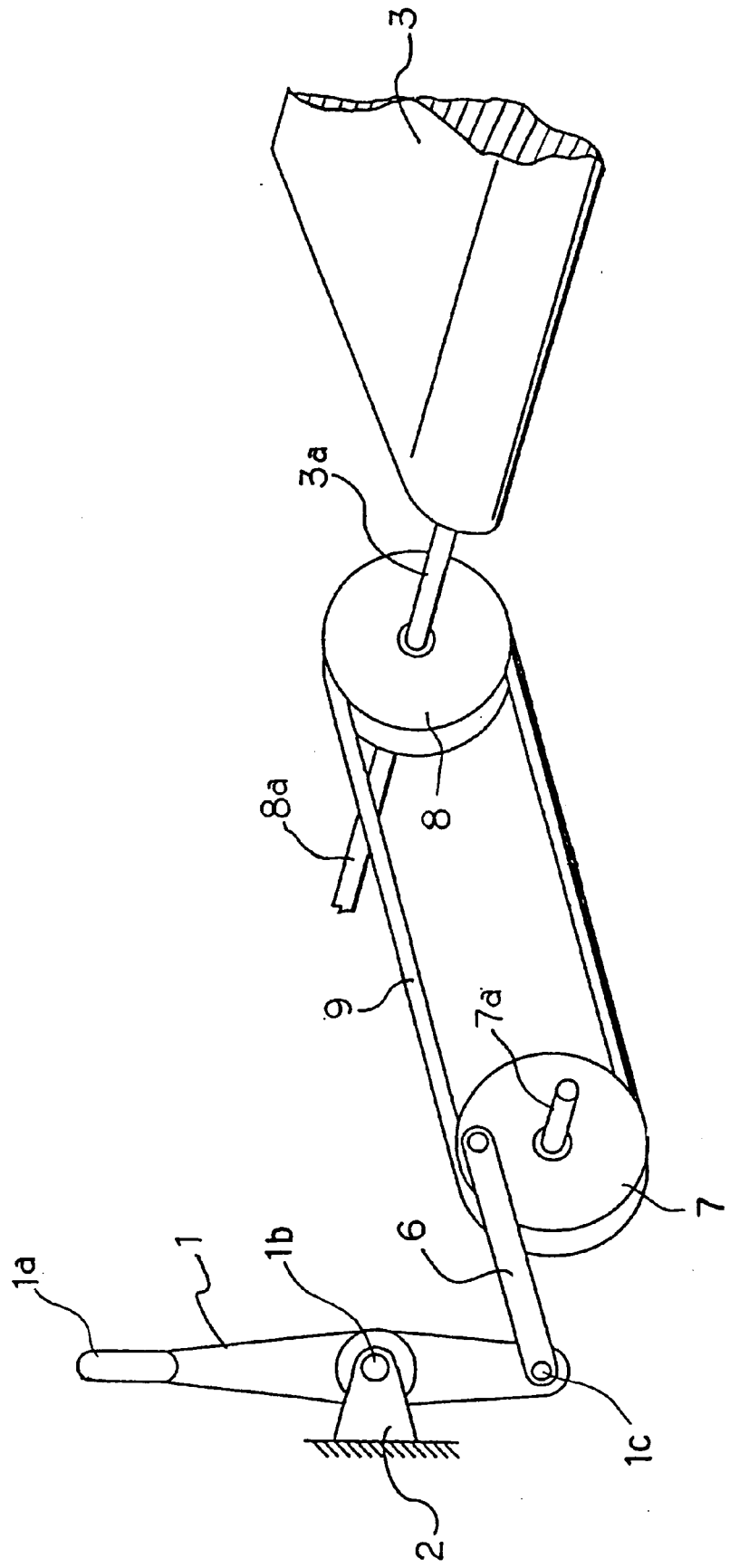
FIG. 5 is a perspective view of a prior-art flight control system.

The output torque of the power assist actuator 21 is varied by the assist force control means 23 in response to the manual operation torque exerted on the surface pivot portion 13a of the control surface 13. As shown in FIG. 4, the output torque of the power assist actuator 21 is varied by the assist force control means 23 with a torque ratio of the output torque of the power assist actuator 21 to the manual operation torque exerted on the surface pivot portion 13a of the control surface 13. In FIG. 4, the torque ratio is indicated by the ratio of an assisted hinge moment range "b" to a manually operated hinge moment range "a", and the maximum operable angle is indicated by a broken line. The ratio of the hinge moment range "b" to total hinge moment range "a+b" is set at a value within 10–90%, desirably 50–80%.

As shown in FIG. 4, the assist force from the power assist actuator 21 is so regulated as to be proportional to the manual control force from the control member 11 in response to the force signal Sf outputted from the force sensor unit 40. Furthermore, the assist force, i.e., the output torque of the power assist actuator 21 is regulated to a degree not more than the maximum operation force of the manual control member 11 which corresponds to a predetermined maximum value of the reaction force detected by the force sensor unit 40. In other words, the assist torque from the power assist actor 21 is regulated to be less than the operation torque applied to the surface pivot portion 13a of the control surface 13 from the manual control member 11 when the predetermined maximum value of the reaction force is detected by the force sensor unit 40.

In the event that the power assist actuator 21 cannot output the assist torque at a normal torque level by failure, the power assist actuator 21 cannot assist the operational force to be inputted to the manual control member 11. Under the condition, the control surface 13 is manually controlled by the pilot with a torque beyond the remaining output torque, such as for example a holding torque or a detonate torque, of the power assist actuator 21 exerted on the surface pivot portion 13a of the control surface 13. The torque corresponds to a manual operation force given to the manual control member by the hand or foot of the pilot.

It will thus be understood that the control surface 13 can be controlled only by the human power in the event of actuator failure in spite of the fact that the control surface 13 can be controlled by the power assist actuator 21 and the human power under the normal condition. In addition, the force mechanically fed back from the control surface 13 to the manual control member 11 can be exerted on the hand or foot of the pilot without providing an artificial feeling apparatus by the reason that the assist force from the power assist actuator is controlled by the assist force control means on the basis of the force signal Sf representative of the reaction force from the force sensor unit 40.

While it has been described in the above embodiment that the control surface is controlled by the power assist actuator and the pilot, a tab may be equipped with the control surface at the rear end of the control surface 13.

The present invention has thus been shown and described with reference to specific embodiments, however, it should be noted that the invention is not limited to the details of the illustrated structures but changes and modifications may be made without departing from the scope of the appended claims.

What is claimed is:

1. A flight control system for controlling a flight of an aircraft, comprising:
 a control member having an input portion, a pivot portion and a control force output portion, said input portion of said control force output portion pivotally move around said pivot portion;
 a control surface pivotally mounted at its hinge portion on said aircraft and controllable to assume different angle positions within a control angle range, said control surface being controlled by the control force outputted from said control member;

a transmission linkage provided between said control force output portion of said control member and said control surface to transmit said control force from said control member to said control surface;

a power assist actuator associated with said control member and said transmission linkage to control said control surface with an assist force, said power assist actuator being constituted by a motor connected to the hinge portion of the control surface to output an assist torque in response to the reaction force detected by said force sensor;

a force sensor provided between said pivot portion of said control member and said aircraft to detect a reaction force exerted thereon by said control member and said transmission linkage, said force sensor producing an output signal representative of said reaction force; and force regulating means for regulating the assist force outputted from said power assist actuator as to be proportional to the control force from said control member in response to said output signal outputted from said force sensor;

wherein the assist torque from the motor is regulated to be less than the operation torque applied to said hinge portion of said control surface from said control member when said predetermined maximum value of said reaction force is detected by said force sensor.

2. A flight control system as set forth in claim 1, in which said force sensor is constituted by a link member pivotally connected at one end with said pivot portion of said control member and at the other end with said aircraft, and a strain gauge attached on said link member to detect a force exerted on the link member by said control member and said transmission linkage.

3. A flight control system as set forth in claim 1, in which said transmission linkage is constituted by a first pulley rotatably supported by said aircraft, a connecting link pivotally connected at one end to said operation force output portion of said control member and at the other end with the peripheral portion of said first pulley, an endless member encircling said first pulley, a second pulley connected with said hinge portion of said control surface and driven by said first pulley through said endless member when said control member is manually operated.

4. A flight control system as set forth in claim 1, which further comprises a surface angle sensor for detecting the angle position of said control surface and outputting an output signal, and in which said force regulating means regulates said assist force outputted from said power assist actuator on the basis of the output signal of said surface angle sensor.

5. A flight control system for controlling a flight of an aircraft, comprising:

a control member having an input portion, a pivot portion and a control force output portion, said input portion of said control force output portion pivotally move around said pivot portion;

a control surface pivotally mounted at its hinge portion on said aircraft and controllable to assume different angle positions within a control angle range, said control surface being controlled by the control force outputted from said control member;

a transmission linkage provided between said control force output portion of said control member and said control surface to transmit said control force from said control member to said control surface;

a power assist actuator associated with said control member and said transmission linkage to control said control surface with an assist force, comprising a motor connected to the hinge portion of the control surface to output an assist torque in response to the reaction force detected by said force sensor;

a force sensor provided between said pivot portion of said control member and said aircraft to detect a reaction force exerted thereon by said control member and said transmission linkage, said force sensor producing an output signal representative of said reaction force;

force regulating means for regulating the assist force outputted from said power assist actuator as to be proportional to the control force from said control member in response to said output signal outputted from said force sensor;

and a motor angle sensor for detecting the angle position of said motor and outputting an output signal, and in which said force regulating means regulates said assist force outputted from said power assist actuator on the basis of the output signal of said motor angle sensor.

* * * * *